United States Patent
Kanenari (10) Patent No.: US 8,471,694 B2
(45) Date of Patent: Jun. 25, 2013

(54) TIRE CONDITION ACQUISITION DEVICE AND TIRE CONDITION MONITORING SYSTEM

(75) Inventor: Daisuke Kanenari, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 459 days.

(21) Appl. No.: 12/820,836

(22) Filed: Jun. 22, 2010

(65) Prior Publication Data

US 2010/0328059 A1    Dec. 30, 2010

(30) Foreign Application Priority Data

Jun. 26, 2009  (JP) ................................ 2009-152241

(51) Int. Cl.
  *B60C 23/00* (2006.01)
  *B60C 23/02* (2006.01)

(52) U.S. Cl.
  USPC .......... 340/442; 340/445; 340/447; 73/146.3; 73/146.4

(58) Field of Classification Search
  USPC ....................................................... 340/447
  See application file for complete search history.

(56) References Cited

U.S. PATENT DOCUMENTS

| | | | |
|---|---|---|---|
| 2,800,795 A * | 7/1957 | Trinca | 73/146.3 |
| 6,016,102 A * | 1/2000 | Fortune et al. | 340/442 |
| 6,591,672 B2 | 7/2003 | Chuang et al. | |
| 7,279,646 B2 * | 10/2007 | Xu | 178/18.01 |
| 7,454,976 B2 | 11/2008 | Wanami et al. | |
| 7,538,660 B2 | 5/2009 | Murakami | |
| 8,031,064 B2 * | 10/2011 | Yu | 340/447 |
| 8,079,079 B2 * | 12/2011 | Zhang et al. | 726/19 |
| 2008/0018445 A1 * | 1/2008 | Shimura | 340/442 |
| 2010/0021692 A1 | 1/2010 | Bormashenko et al. | |
| 2010/0283766 A1 * | 11/2010 | Shieh | 345/179 |

FOREIGN PATENT DOCUMENTS

| | | |
|---|---|---|
| JP | 7218362 | 8/1995 |
| JP | 2000-177342 | 6/2000 |
| JP | 2003-165465 | 6/2003 |
| JP | 2005-153769 | 6/2005 |
| JP | 2006033689 | 2/2006 |
| JP | 2006-074351 | 3/2006 |
| JP | 2006-234481 | 9/2006 |

(Continued)

OTHER PUBLICATIONS

Chinese Office Action dated Jun. 5, 2012 in the Chinese patent application No. 201010218261.2; English translation of office action.

*Primary Examiner* — Jennifer Mehmood
*Assistant Examiner* — John Mortell
(74) *Attorney, Agent, or Firm* — Thorpe North & Western LLP (57) ABSTRACT

A tire condition acquisition device located in a tire and that transmits at least tire internal air pressure information includes: a housing that allows outside air to enter in only through a ventilation hole; an air pressure detecting element disposed in the housing and that detects an air pressure of air that enters in through the ventilation hole, and converts the detected air pressure to an electric signal which is then output; and a transmission circuit disposed in the housing and that transmits the detected air pressure information via electromagnetic waves based on the electric signal output from the air pressure detecting element; wherein at least the ventilation hole and an area peripheral thereto are treated so as to be water repellent.

19 Claims, 11 Drawing Sheets

FOREIGN PATENT DOCUMENTS

| | | |
|---|---|---|
| JP | 2007-131029 | 5/2007 |
| JP | 2007-196834 | 8/2007 |
| JP | 2007-326475 | 12/2007 |
| JP | 2008-062730 | 3/2008 |

\* cited by examiner

TIRE CONDITION ACQUISITION DEVICE AND TIRE CONDITION MONITORING SYSTEM

PRIORITY CLAIM

This application is based upon and claims the benefit of priority from Japanese Patent Application No. 2009-152241, filed Jun. 26, 2009, the entire contents of which is incorporated herein by reference.

BACKGROUND

1. Technical Field

The present invention relates to a tire condition acquisition device and tire condition monitoring system that can avoid malfunction and function loss due to a tire puncture repair agent.

2. Related Art

Conventionally, tire air pressure inspection management for vehicles has been important, and many accidents are caused by improper tire pressure. Therefore, tire condition monitoring systems are known that include a tire information acquisition device in each wheel that detects and transmits information regarding an air pressure in a wheel tire, and a monitoring device that acquires the tire air pressure information transmitted from the tire information acquisition devices in each tire, monitors the air pressure for each tire, and issues a warning when there is a problem with the air pressure (for example, see Japanese Patent No. 3962073).

The tire information acquisition device of this tire condition monitoring system is disposed in an internal space formed between a tire and a wheel. The tire information acquisition device is constructed from an air pressure sensor formed from a pressure detecting element that detects air pressure inside the tire and a transmitter or the like that converts detection results of the air pressure sensor to an electric signal and transmits the electric signal to a monitoring device via electromagnetic waves, the tire information acquisition device being stored in a case. The case is provided with a ventilation hole in order to introduce air from the internal space formed between the tire and the wheel into the air pressure sensor located therein. The monitoring device is disposed in proximity to a driver's seat, receives tire air pressure information transmitted from the tire information acquisition device, and if the air pressure of the tire is below a standard pressure set beforehand, a predetermined warning is generated for the driver.

However, if the tire equipped with the tire information acquisition device is punctured and the tire is repaired using a tire puncture repair agent, there is a problem that the tire information acquisition device will cease functioning due to the tire puncture repair agent. Specifically, if the tire puncture repair agent adheres to the ventilation hole of the tire information acquisition device, communication between the tire inner space and the air pressure sensor will be blocked, thereby making detection of the air pressure impossible.

In order to resolve the aforementioned problems, a tire air pressure monitoring system, described in Japanese Unexamined Patent Application Publication No. 2007-196834, a wheel condition detecting device, described in Japanese Unexamined Patent Application Publication No. 2008-062730, and the like have been proposed.

With the tire air pressure monitoring system described in Japanese Unexamined Patent Application Publication No. 2007-196834, if a tire puncture repair agent is used to repair a puncture, after the puncture is repaired occupants are notified that there is a possibility that a tire air pressure will decrease. Specifically, puncture determining means that determine if each tire of a vehicle has been punctured, and tire puncture repair agent use determining means that determine after a puncture has been determined whether or not the puncture has been repaired using the tire puncture repair agent are provided. This system is configured so as to issue a warning even if a tire air pressure value transmitted from the air pressure sensor is a normal value when the tire puncture repair agent use determining means determines that the puncture has been repaired using the tire puncture repair agent.

Furthermore, with the wheel condition detecting device described in Japanese Unexamined Patent Application Publication No. 2008-062730, a connecting part opening and closing mechanism that opens and closes a ventilation hole formed in a case is provided on a TPMS valve, thereby restricting a tire puncture repair agent from entering a detection space through the ventilation hole when a puncture is repaired. This connecting part opening and closing mechanism is configured so as to include a mechanical mechanism containing a lid body and a screw coil spring, and the ventilation hole is automatically opened and closed by centrifugal force that acts on a wheel. Thereby, foreign material can be prevented from entering from a connecting part for detection, and normal detection conditions can be maintained.

However, with the tire air pressure monitoring system described in Japanese Unexamined Patent Application Publication No. 2007-196834, puncture determining means and tire puncture repair agent use determining means are required, resulting in a complex construction, and increased manufacturing costs. Additionally, since a warning is issued after repairs are made using the tire puncture repair agent, even if the tire air pressure value is at a normal value, there is a problem that a driver will have difficulty determining whether or not the tire air pressure is normal.

Furthermore, with the wheel condition detecting device described in Japanese Unexamined Patent Application Publication No. 2008-062730, the connecting part opening and closing mechanism is complicated. Therefore, there are problems of complicated manufacturing and additional costs.

An object of the present invention is to provide a tire condition acquisition device and tire condition monitoring system that can reduce malfunction and loss of function of the tire condition acquisition device even if a puncture is repaired using a tire puncture repair agent.

SUMMARY

The present invention is a tire condition acquisition device disposed in a tire and that transmits at least tire internal air pressure information, including: a housing that allows outside air to enter in only through a ventilation hole; an air pressure detecting element disposed in the housing and that detects an air pressure of air that enters in through the ventilation hole, and converts the detected air pressure to an electric signal which is then output; and a transmission circuit disposed in the housing and that transmits the detected air pressure information via electromagnetic waves based on the electric signal output from the air pressure detecting element; the main characteristic of which devices is that at least the ventilation hole and an area peripheral thereto are treated so as to be water repellent.

The present invention provides an advantage in that a liquid of a tire repair agent will not easily plug a ventilation hole even if a tire puncture is repaired using a tire puncture repair agent. Therefore malfunction and loss of function of a tire condition acquisition device can be reduced compared to conventional technologies.

DETAILED DESCRIPTION

Hereinafter, an embodiment of the present invention is described based on the accompanying drawings.

Figure 1:
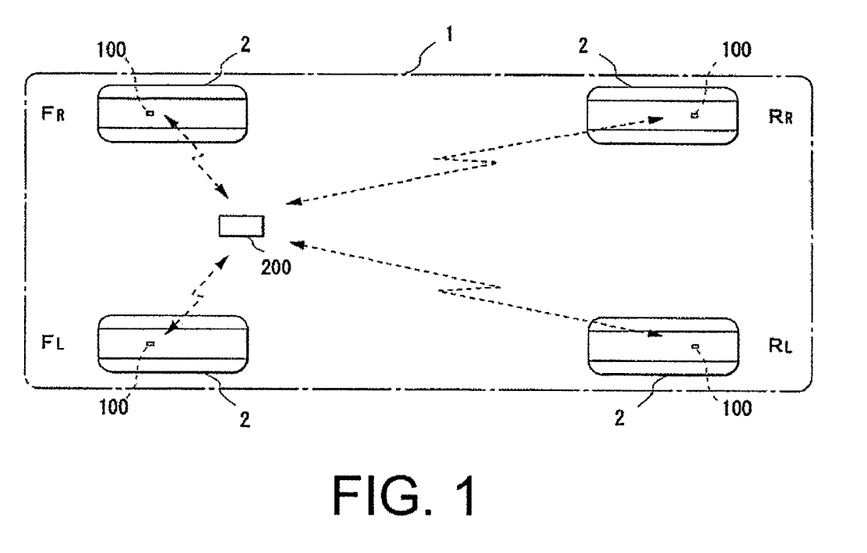
FIG. 1 is a component diagram showing an entire tire condition monitoring system according to an embodiment of the present invention.
Figure 2:
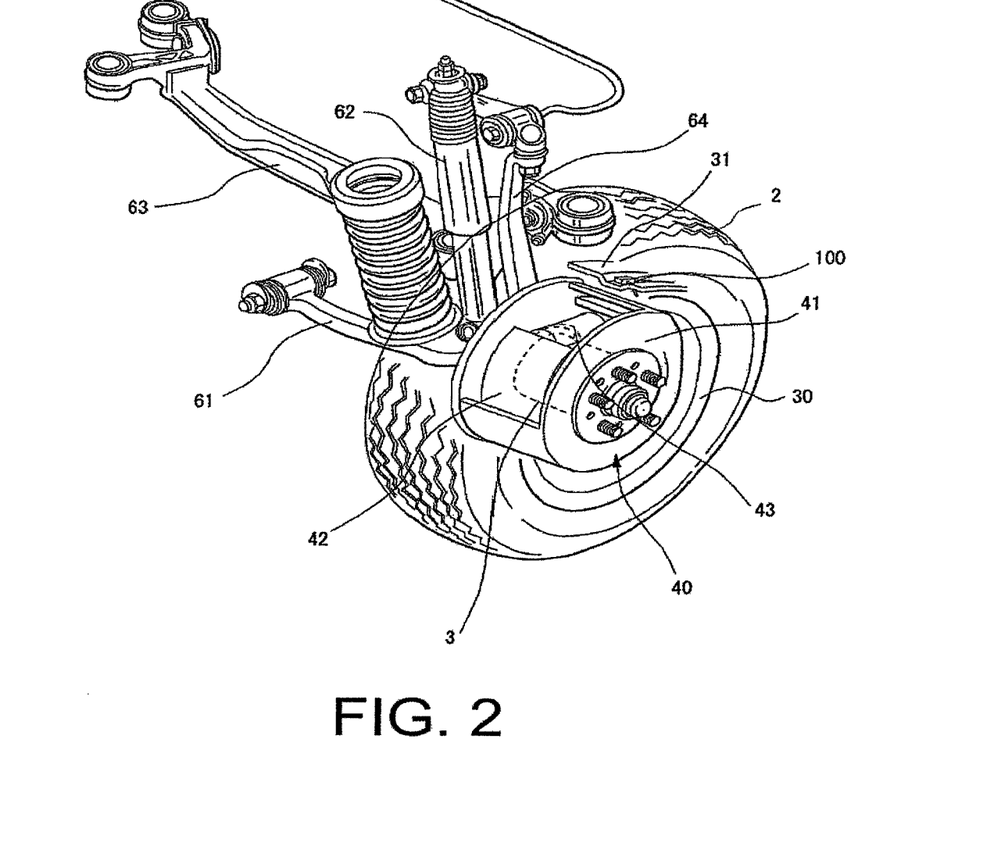
FIG. 2 is an illustration showing a mounted state of the tire condition acquisition device according to an embodiment of the present invention.
Figure 3:
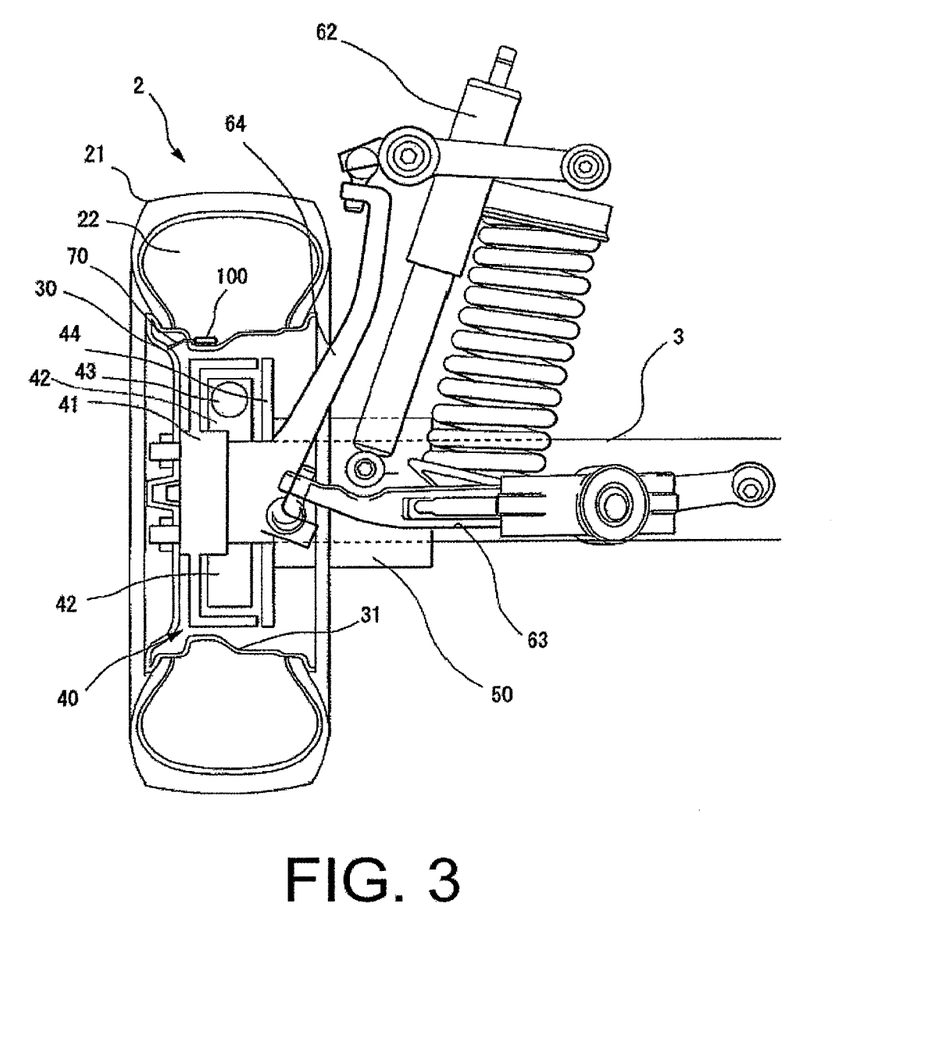
FIG. 3 is another illustration showing the mounted state of the tire condition acquisition device according to an embodiment of the present invention.
Figure 4:
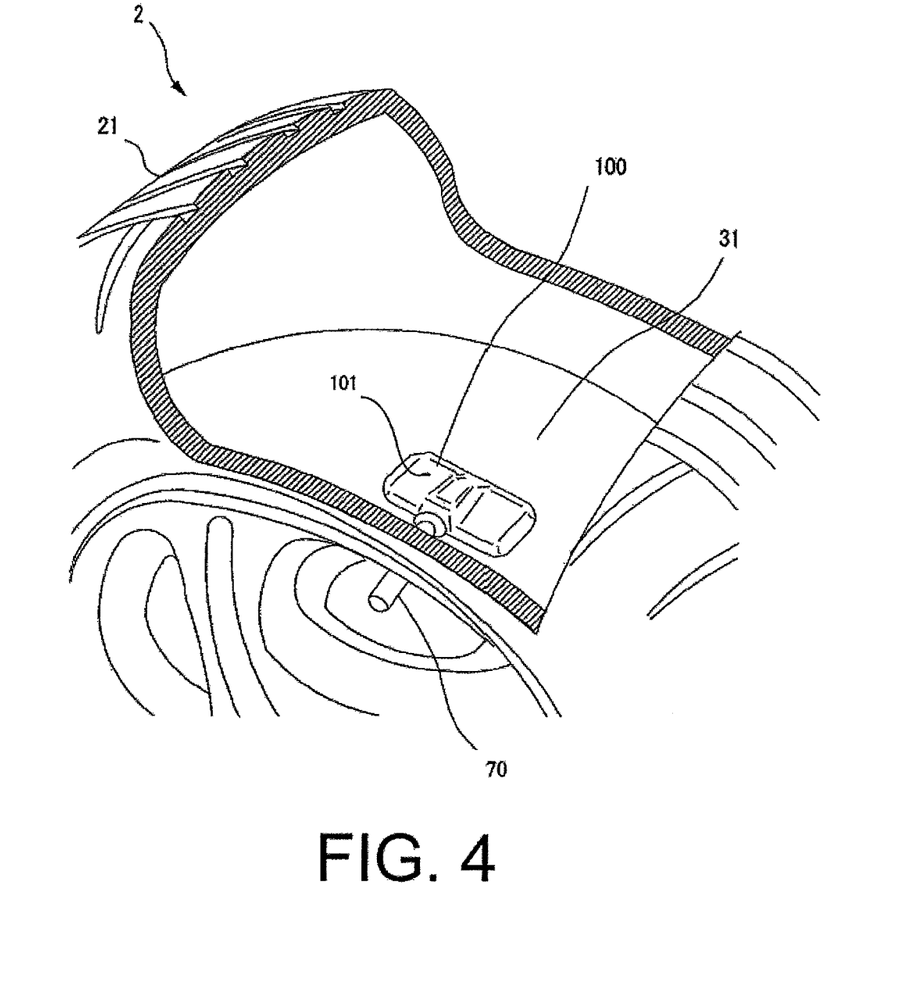
FIG. 4 is yet another illustration showing the mounted state of the tire condition acquisition device according to an embodiment of the present invention.

FIG. 1 is a component diagram showing the entire tire condition monitoring system according to a first embodiment of the present invention. FIG. 2 through FIG. 4 are illustrations showing a mounted state of a tire condition acquisition device according to a first embodiment of the present invention.

In FIG. 1, 1 is a vehicle, such as a normal four wheel passenger vehicle. Tire condition acquisition devices 100 that detect tire conditions and transmit detection results thereof by electromagnetic waves are provided in each of four tires 2.

Furthermore, a monitoring device 200, including a controller and a display panel, that receives the electromagnetic waves transmitted from the tire condition acquisition devices 100 and displays the detection results on the display panel is provided in proximity to a driver's seat.

Note that in the present embodiment, the tire condition monitoring system includes the tire condition acquisition devices 100 that detect air pressure of the tires 2, and displays the detection results thereof on the display panel of the monitoring device 200. However, a tire condition monitoring system that detects and displays tire conditions other than tire air pressure is also possible.

Furthermore, in FIG. 2 to FIG. 4, 2 is a tire, 3 is an axle, 100 is the tire condition acquisition device, 40 is a drum brake mechanism, 41 is a brake drum, 42 is a brake shoe, is a wheel cylinder, 44 is a back plate, 50 is a bearing mechanism, 61 is a lower arm, 62 is a damper, 63 is a transverse yoke, and 64 is a knuckle. The tire 2 is constructed from a wheel 30 that includes a tire main body 21 and a rim 31. The drum brake mechanism 40 is disposed in the wheel 30 so as to be covered by the wheel 30. Furthermore, the back plate 44 is secured to the bearing mechanism 50 and the brake drum 41 is fastened together with the wheel 30 to the axle 3.

The tire condition acquisition device 100 is mounted at a predetermined position on the rim 31 inside an air chamber 22 of the tire 2, detects a pressure in the air chamber 22 of the tire 2 using a pressure detecting element (described later) provided inside the tire condition acquisition device 100, and converts the detection results to digital values. Furthermore, the tire condition acquisition device 100 generates and transmits digital information including these digital values. The digital information includes unique identifying information for each of the tire condition acquisition devices 100 in addition to the digital values of the detection results.

Figure 5:
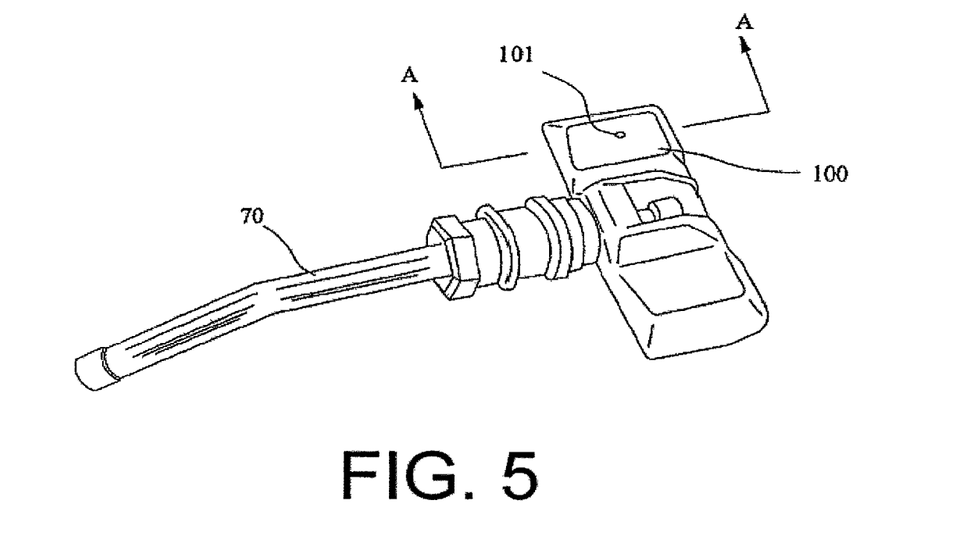
FIG. 5 is a perspective view showing the tire condition acquisition device according to an embodiment of the present invention.
Figure 6:
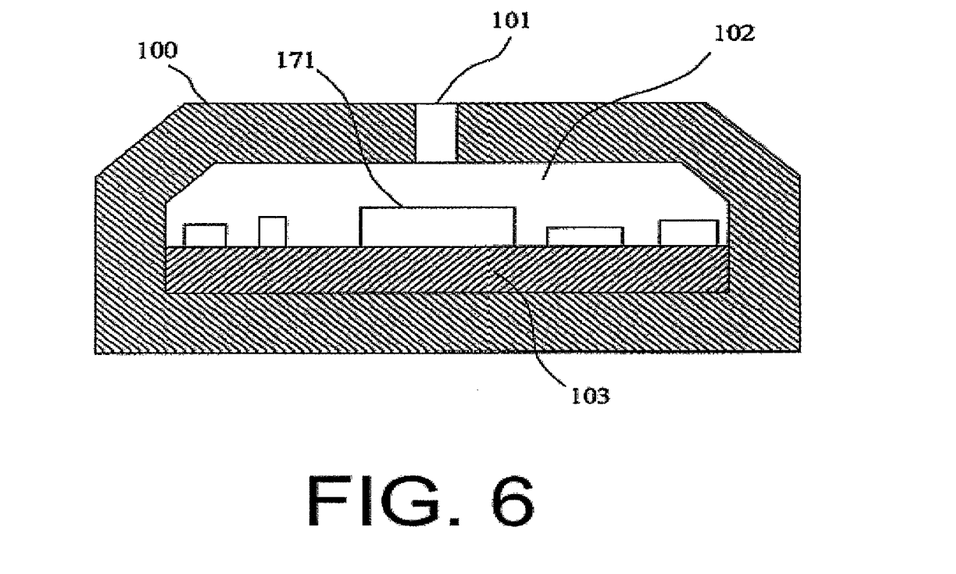
FIG. 6 is a cross-sectional view in a direction of arrow A-A of FIG. 5.

Note that in the present embodiment, as shown in FIG. 4 and FIG. 5, the tire condition acquisition device 100 is mounted on an edge of a tire interior side of a valve stem 70 that is mounted in the rim 31, and are positioned along a surface of the rim 31. Furthermore, as shown in FIG. 5 and FIG. 6, a housing of the tire condition acquisition device 100 has a ventilation hole 101 that connects to an inner space 102 provided in the housing. Furthermore, a circuit board 103 containing an air pressure sensor 111 is mounted in the inner space 102 in the housing. Furthermore, at least the ventilation hole 101 and an area peripheral thereto of the housing of the tire condition acquisition device 100 is treated so as to be water repellent. This water repellency treatment is described below in detail.

The tire condition acquisition devices 100 are provided inside each of the tires 2, detect the air pressure in each of the tires 2, and wirelessly transmit the detection results to the monitoring device 200.

Figure 7:
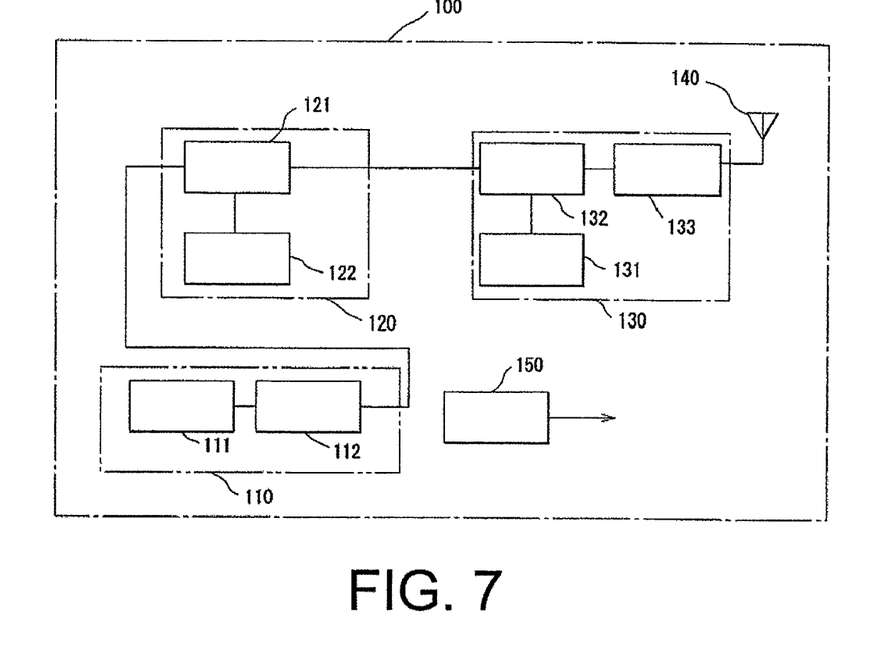
FIG. 7 is a block diagram showing electrical system circuitry of the tire condition acquisition device according to an embodiment of the present invention.

As shown in FIG. 7, an electrical circuit of the tire condition acquisition devices 100 contains a sensor unit 110, a central processor 120, a transmitter 130, an antenna 140, and a battery 150.

The sensor unit 110 contains an air pressure sensor 111 and an A/D converter circuit 112.

The air pressure sensor 111 detects a pressure of the air inside the tire 2, and outputs detection results thereof as an analog electric signal. The air pressure sensor 111 can be any common commercial device.

The A/D converter circuit 112 converts the analog electric signal output from the air pressure sensor 111 to a digital signal, and outputs the digital signal to a CPU 121. The digital signal corresponds to an air pressure value of the tire 2.

The central processor 120 contains a commonly known CPU 121 and a memory unit 122.

The CPU 121 operates based on a program stored in a semiconductor memory of the memory unit 122, and transmits data detected by the sensor unit 110 to the monitoring device 200 at predetermined time intervals (for example five minutes) when electrical power is supplied. Furthermore, the memory unit 122 is pre-programmed with the unique identifying information of the tire condition acquisition device 100, and the CPU 121 transmits the unique identifying information along with the detection data to the monitoring device 200.

The memory unit 122 contains read-only memory (ROM) pre-programmed with the program that drives the CPU 121 and non-volatile semiconductor memory that can be electrically rewritten such as electrically erasable programmable read-only memory (EEPROM). The unique identifying information of each of the tire condition acquisition devices 100 is pre-programmed in a non-rewritable predetermined region in the memory unit 122 at the time of manufacture.

The transmitter 130 contains an oscillator circuit 131, a modulation circuit 132, and a high-frequency amplifier circuit 133, and uses the modulation circuit 132 to modulate carrier waves generated by the oscillator circuit 131 containing a standard PLL circuit or the like (for example, carrier waves with a predetermined frequency band of 315 MHz), and transmit the modulated carrier waves to the antenna 140 as a high-frequency current of the predetermined frequency band of 315 MHz through the high-frequency amplifier circuit 133.

Furthermore, the modulation circuit 132 modulates the carrier waves based on the transmitted data, and outputs the carrier waves to the high-frequency amplifier circuit 133.

Note that in the present embodiment, the frequency is set to the frequency band of 315 MHz, but different frequency bands are also possible. Furthermore, the modulation method of the modulation circuit 132 can be amplitude shift keying (ASK), frequency modulation (FM), frequency shift keying (FSK), phase modulation (PM), phase shift keying (PSK), and the like.

The antenna 140 is for communicating with the monitoring device 200 using electromagnetic waves and in the present embodiment is set to the predetermined frequency band of 315 MHz, as described above.

The battery 150 is, for example, a secondary battery or the like, and supplies each unit with electrical energy necessary for powering the tire condition acquisition devices 100.

Note that if the tire condition acquisition devices 100 are embedded inside the tires 2 when the tires 2 are manufactured, an IC chip or other components shall of course be designed so as to sufficiently withstand heat during vulcanization.

Figure 8:
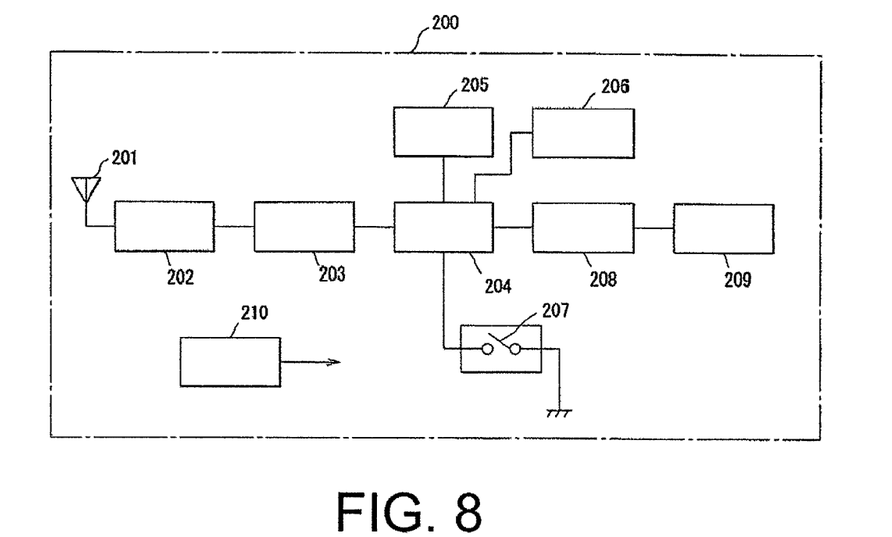
FIG. 8 is a block diagram showing electrical system circuit of a monitoring device according to an embodiment of the present invention.

As shown in FIG. 8, an electrical circuit of the monitoring device 200 includes an antenna 201, a receiver 202, a receiving buffer 203, central processor 204, a memory 205, an operating unit 206, a switch 207, a display controller 208, a display unit 209, and a power supply unit 210. Furthermore, the monitoring device 200 is located in proximity to the driver's seat of the vehicle.

The antenna 201 is set to a same frequency as a transmission frequency of the tire condition acquisition devices 100, and is connected to an input side of the receiver 202.

The receiver 202 receives via the antenna 201 the electromagnetic waves, at a predetermined frequency at the 315 MHz band, transmitted from the tire condition acquisition devices 100, demodulates the received signals, then converts the signals into binary serial digital data, which is then output to the receiving buffer 203.

The receiving buffer 203 temporarily stores the serial digital data output from the receiver 202, and outputs this data to the central processor 204 in accordance with commands from the central processor 204.

The central processor 204 primarily is constructed of a commonly known CPU, operates based on a program stored in the memory 205, and, when electrical power is supplied, analyzes the detection data received from the tire condition acquisition devices 100 and displays the data on the display unit 209 by means of the display controller 208.

Furthermore, the central processor 204 inputs a signal and information from the operating unit 206 and the switch 207, initializes a communication protocol with the tire condition acquisition devices 100, and communicates with each of the tire condition acquisition devices 100 using the initialized communication protocol.

The memory 205 contains read-only memory (ROM) in which the program that drives the CPU of the central processor 204 is stored, and non-volatile semiconductor memory that can be electrically rewritten such as electrically erasable programmable read-only memory (EEPROM). A communication protocol table that was pre-programmed at the time of manufacture is stored in the rewritable semiconductor memory.

The communication protocol table contains information such as communication protocols, transfer bit rates, data formats, and the like, associated with the unique identifying information for each of the tire condition acquisition devices 100.

Note that the data in the communication protocol table can be updated, including changing, adding, or deleting, using the operating unit 206.

The operating unit 206 includes a keyboard constructed of a plurality of switches for example, and is provided in order to input initialization information and/or the unique identifying information of the tire condition acquisition devices 100.

The switch 207 is for sending a command to the central processor 204 to start initialization.

The display controller 208 displays values for the air pressure of each of the tires 2 on the display unit 209 in association with the mounted position of each of the tires 2, based on the data input from the central processor 204.

The power supply unit 210 receives power supplied from a battery installed in the vehicle, converts the power to a voltage that is compatible with the various components that form the monitoring device 200, and supplies the voltage to each unit.

With the aforementioned tire condition monitoring system, at least the ventilation hole 101 and the area peripheral thereto of the tire condition acquisition device 100 are treated so as to be water repellent. Therefore, even if puncture repair of the tire is performed using the tire puncture repair agent, the liquid of the tire repair agent will not easily block the ventilation hole 101. Thus, malfunction and function loss of the tire condition acquisition device 100 can be reduced, as compared to conventional technologies.

Examples of the water repellency treatment performed on the ventilation hole 101 and the area peripheral thereto of the tire condition acquisition device 100 are described below.

EXAMPLE 1

With the tire condition acquisition device 100 of Example 1, as illustrated in FIG. 4, when the housing of the tire condition acquisition device 100 is mounted on the rim 31 in the tire 2, the ventilation hole 101 is provided so as to open to a side in a direction that centrifugal force due to rotation of the tire 2 acts. In addition, a diameter of the ventilation hole 101 is set to be 0.5 mm or less.

By providing the ventilation hole 101 on the side in the direction that centrifugal force acts, the puncture repair liquid will not easily enter the ventilation hole 101. Additionally, the puncture repair liquid will not easily enter the ventilation hole 101 due to surface tension because the diameter of the ventilation hole 101 is 0.5 mm or less. Therefore, malfunction and function loss of the tire condition acquisition device 100 can be reduced, as compared to conventional technologies.

EXAMPLE 2

Figure 9:
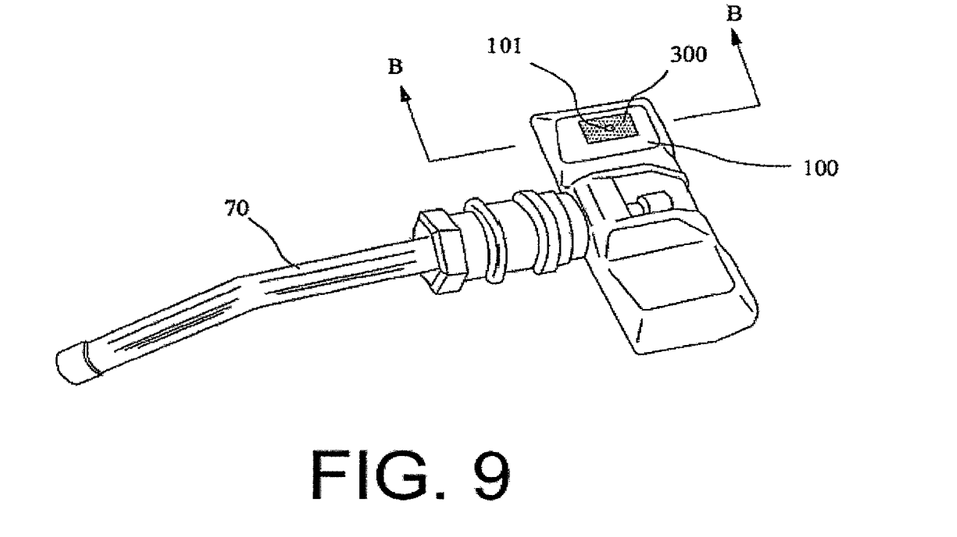
FIG. 9 is a perspective view showing a tire condition acquisition device according to a second example of the present invention.
Figure 10:
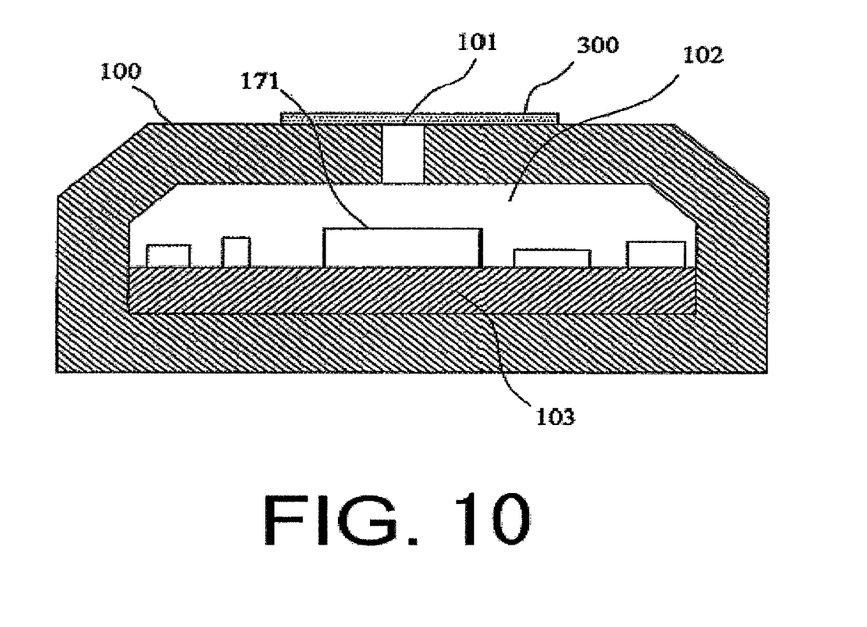
FIG. 10 is a cross-sectional view in a direction of arrow B-B of FIG. 7.

With the tire condition acquisition device 100 of Example 2, as illustrated in FIG. 9 and FIG. 10, a shielding member 300 having both water repellency and breathability is applied so as to cover the ventilation hole 101. By blocking the ventilation hole 101 with the shielding member 300 that has been treated so as to be water repellent, the puncture repair liquid will not easily enter the ventilation hole 101. Therefore, malfunction and function loss of the tire condition acquisition device 100 can be reduced, as compared to conventional technologies.

Note that the shielding member 300 must be a member with breathability, and may be a breathable member permeated with a water repellent agent, or may be a cloth with ultrafine raised hairs.

Furthermore, even if a nonwoven material, a woven material, or a sponge with a breathable foam is used as the shielding member 300, the puncture repair liquid will likewise not easily enter into the ventilation hole 101.

Furthermore, the shielding member 300 is preferably treated to be water repellent so that a water contact angle of a surface thereof is 80 degrees or larger.

EXAMPLE 3

In Example 3, the housing of the tire condition acquisition device 100 is formed from a member having water repellency. By constructing the housing of the tire condition acquisition device 100 using the member having water repellency, the puncture repair liquid will not easily enter the ventilation hole 101. Therefore, malfunction and loss of function of the tire condition acquisition device 100 can be reduced, as compared to conventional technologies.

Note that the material with water repellency from which the member that forms the housing of the tire condition acquisition device 100 is constructed can be, for example, a silicon resin or a fluorine resin; a modified resin grafted with an organic silyl group or a fluoroalkyl group, or the like; or the like. Furthermore, as with the shielding member of Example 2, the member surface is preferably constructed from a material having a water contact angle of 80 degrees or larger. Additionally, an inner surface of the ventilation hole 101 is also preferably treated so as to be water repellent.

EXAMPLE 4

Figure 11:
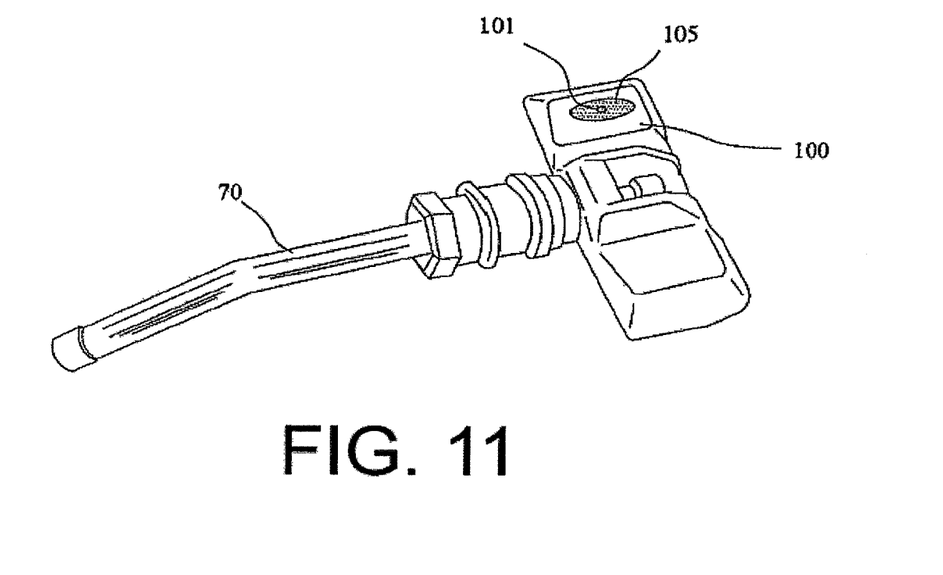
FIG. 11 is a perspective view showing a tire condition acquisition device according to a fourth example of the present invention.

With Example 4, as illustrated in FIG. 11, the ventilation hole 101 in the housing of the tire condition acquisition device 100 and the housing surface 105 in the area peripheral to the ventilation hole 101 are formed with a fine concavoconvex shape that displays water repellency. By forming the ventilation hole 101 in the housing of the tire condition acquisition device 100 and the housing surface in the area peripheral to the ventilation hole 101 with a fine concavoconvex shape that displays water repellency, the puncture repair liquid will not easily enter the ventilation hole 101. Therefore, malfunction or loss of function of the tire condition acquisition device 100 can be reduced, as compared to conventional technologies.

Note that the shape of a fine concavoconvex shape is not particularly limited, but a fractal shape or periodic pattern is preferable as illustrated in FIG. 12 through FIG. 15.

Herein, "fractal" refers to a shape/pattern wherein a part of the shape exhibits "self-similarity" with regards to a whole. Such shapes/patterns are widely observed in the natural world, including coastline shapes, mountain shapes, branched tree shapes, cloud shapes, and the like. For example, a coastline appears to have a complex shape when viewed on a large scale, and, when magnified, an even more detailed shape becomes visible. Thus, the shape is as complex magnified as when not magnified. On the other hand, with standard shapes/patterns, shapes/patterns of details change minimally when magnified, and gradually form a smooth shape. When measuring a length of the coastline shape, if a smaller scale was used for measuring, intricate concave and convex shapes that are insignificant on a larger scale would be measured, and thus measurement values would be larger. Therefore, the length of such a shape is thought to be infinite.

Figure 12:
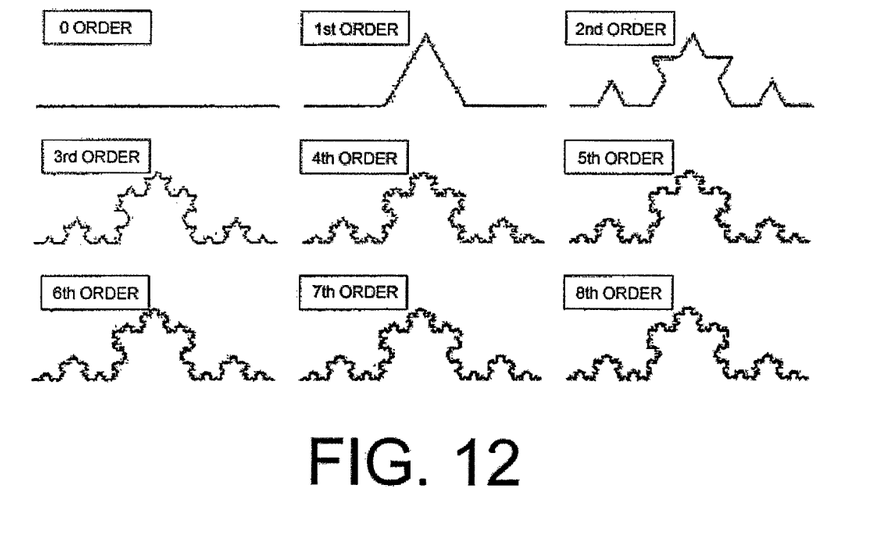
FIG. 12 is an illustration showing a fractal shape that is an example of a housing surface shape according to the fourth example of the present invention.

A Koch curve illustrated in FIG. 12 is an example of a fractal shape/pattern, and is obtained by endlessly repeating a process of dividing a straight line into three equal parts and forming equilateral triangles with vertices at two dividing points.

Figure 13:
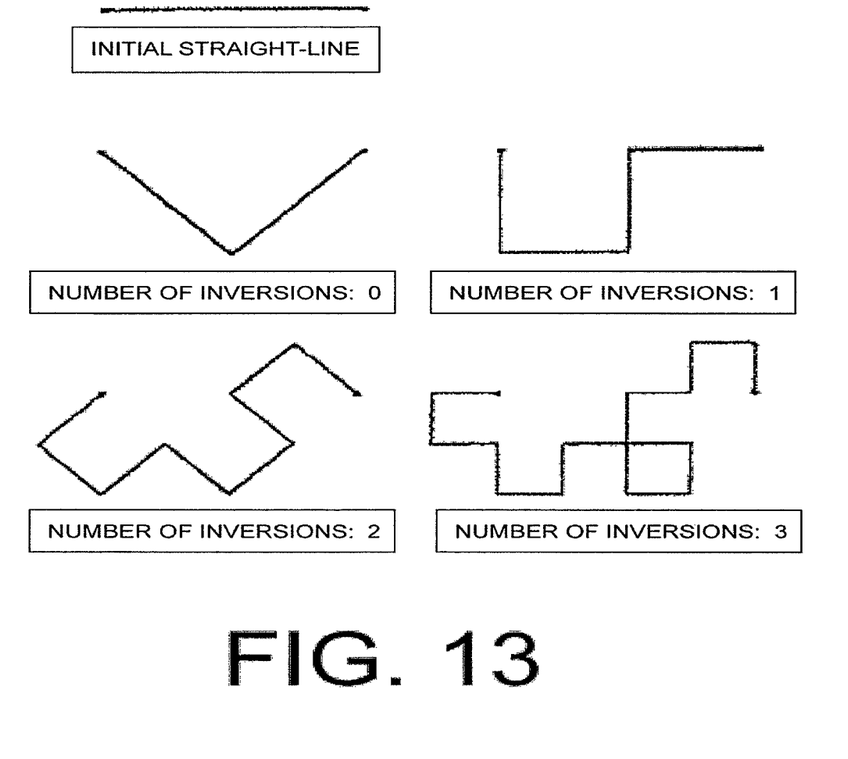
FIG. 13 is another illustration showing a fractal shape that is an example of the housing surface shape according to the fourth example of the present invention.
Figure 14:
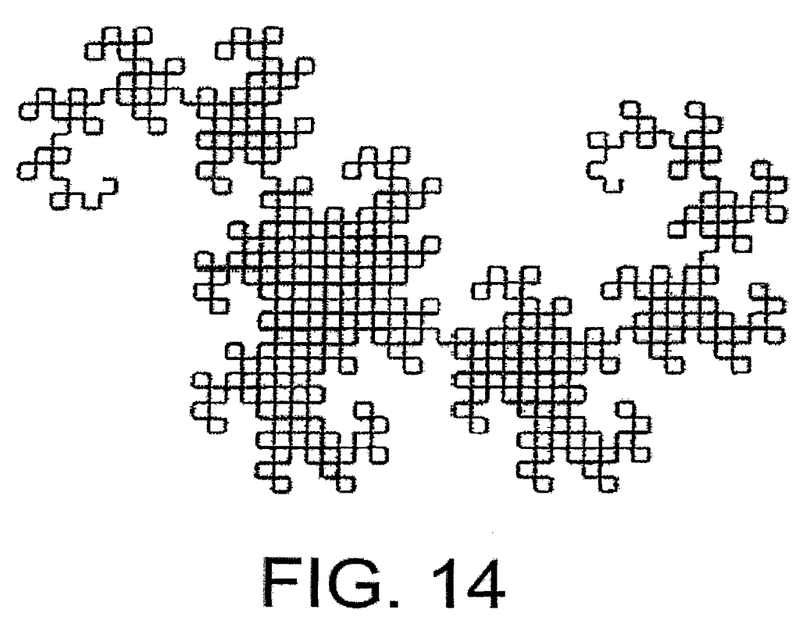
FIG. 14 is yet another illustration showing a fractal shape that is an example of the housing surface shape according to the fourth example of the present invention.
Figure 15:
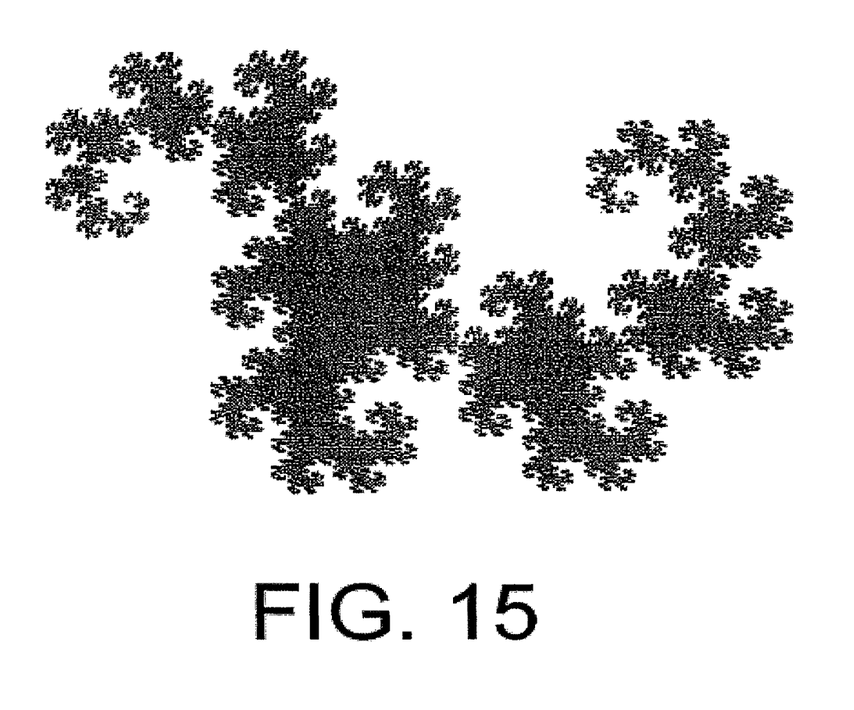
FIG. 15 is still yet another illustration showing a fractal shape that is an example of the housing surface shape according to the fourth example of the present invention.

The dragon curve illustrated in FIG. 13 through FIG. 15 is an example of a fractal shape/pattern obtained by infinitely (recursively) repeating a process of bending a straight line 90° at a center point in a prescribed direction (similar to folding a paper n times and then opening). The shape is like a dragon and hence it is called a dragon curve. FIG. 14 illustrates a 10th order dragon curve, and FIG. 15 illustrates a 15th order dragon curve. Note that the fractal shapes are not limited to the illustrated shapes/patterns, and it is not absolutely critical that the presented shapes be mathematically proper shapes. A requirement is that a surface area be as large as possible so that the water contact angle will be 80 degrees or larger.

EXAMPLE 5

In Example 5, the housing of the tire condition acquisition device 100 is formed from a resin. Furthermore, the ventilation hole 101 and the housing surface 105 in the area peripheral to the ventilation hole 101 are formed with a fine concavoconvex shape that displays water repellency, as in Example 4. This concavoconvex shape is formed using a mold that was used when molding the housing of the tire condition acquisition device 100.

Note that the fine concavoconvex shape can be formed by sand blasting, and may be formed into a regular, fine net-pattern.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A tire condition acquisition device disposed in a tire and that transmits at least tire internal air pressure information, comprising:
 a housing that allows outside air to enter in only through a ventilation hole, wherein the ventilation hole and a housing surface of an area peripheral to the ventilation hole has a fine concavoconvex shape that displays water repellency;
 an air pressure detecting element disposed in the housing and that detects an air pressure of air that enters in through the ventilation hole, and converts the detected air pressure to an electric signal which is then output; and
 a transmission circuit disposed in the housing and that transmits the detected air pressure information via electromagnetic waves based on the electric signal output from the air pressure detecting element;
 wherein at least the ventilation hole and an area peripheral thereto of the housing are treated so as to be water repellent.

2. The tire condition acquisition device according to claim 1, wherein, when the housing is mounted in the tire, the ventilation hole is provided so as to open to a side in a direction that centrifugal force due to rotation of the tire acts, and a diameter of the ventilation hole is 0.5 mm or less.

3. The tire condition acquisition device according to claim 1, wherein a shielding member having both water repellency and breathability is provided so as to cover the ventilation hole.

4. The tire condition acquisition device according to claim 3, wherein the shielding member is formed from a nonwoven material, a woven material, or a sponge containing breathable foam.

5. The tire condition acquisition device according to claim 1, wherein the housing is formed from a member having water repellency.

6. The tire condition acquisition device according to claim 1, wherein the housing is formed from a resin, and the concavoconvex shape is formed using a mold that was used when molding the housing.

7. A tire condition monitoring system, comprising:
 a tire condition acquisition device disposed in a tire and that transmits at least tire internal air pressure information; and
 a monitoring device that receives the tire internal air pressure information transmitted from the tire condition acquisition device and provides a warning of abnormal tire internal air pressure based on the tire internal air pressure information received,
 wherein the tire condition acquisition device comprises a tire condition acquisition device according to claims 1.

8. The tire condition monitoring system of claim 7, wherein the monitoring device further comprises a controller and a display panel, the display panel being in proximity to a vehicle driver seat, wherein the controller receives the tire internal air pressure information as electromagnetic waves transmitted from the tire condition acquisition device and the display panel is operable to display the tire internal air pressure information.

9. The tire condition monitoring system of claim 7, wherein the tire condition acquisition device is mounted at a predetermined position on a rim inside an air chamber of the tire and comprises a pressure detecting element operable to detect the pressure in the air chamber of the tire, the tire condition acquisition device being further operable to convert the detected pressure to a digital value, generate and transmit digital information including these digital values, and provide unique identifying information for multiple different tire condition acquisition devices.

10. The tire condition monitoring system of claim 7, wherein the tire condition acquisition device further comprises a circuit board containing an air pressure sensor mounted in an inner space of the housing.

11. The tire condition monitoring system of claim 7, further comprising a tire condition acquisition device inside each tire of a vehicle, the tire acquisition device(s) comprising means to detect the air pressure in each tire of the vehicle, and means to wirelessly transmit the detected air pressure to the monitoring device.

12. The tire condition monitoring system of claim 7, wherein:
 the tire condition acquisition device further comprises a central processor, a transmitter, an antenna, and a battery; and
 the air pressure detecting element comprises an air pressure sensor and an A/D converter circuit.

13. The tire condition monitoring system of claim 12, wherein the central processor operates based on a program stored in a semiconductor memory and transmits data detected by the air pressure detecting element to the monitoring device at predetermined time intervals when electrical power is supplied from the battery.

14. The tire condition monitoring system of claim 12, wherein the transmitter comprises an oscillator circuit, a modulation circuit, and a high-frequency amplifier circuit, wherein the modulation circuit modulates carrier waves generated by the oscillator circuit, and the transmitter is operable to transmit the modulated carrier waves to the antenna as a high-frequency current of a predetermined frequency band of 315 MHz through the high-frequency amplifier circuit.

15. The tire condition monitoring system of claim 7, further comprising an operating unit including a keyboard constructed of a plurality of switches to enable input of tire condition acquisition device initialization information or unique identifying information of the tire condition acquisition device.

16. A method for monitoring a tire condition, comprising:
 acquiring at least tire internal air pressure information from a tire using a tire condition acquisition device disposed in the tire;
 transmitting the at least tire internal air pressure information from the tire condition acquisition device to a monitoring device; and
 receiving the at least tire internal air pressure information transmitted from the tire condition acquisition device; and
 providing a warning of abnormal tire internal air pressure based on the at least tire internal air pressure information received when the at least tire internal air pressure information comprises an abnormality;
 wherein the tire condition acquisition device comprises a tire condition acquisition device according to claim 1.

17. The method for monitoring a tire condition of claim 16, wherein receiving comprises receiving the at least tire internal air pressure information on a receiver via an antenna as electromagnetic waves at a predetermined frequency in a 315 MHz band, and the method further comprises:
 demodulating the electromagnetic waves;
 converting the electromagnetic waves into binary serial digital data;
 outputting the binary serial digital data to a receiving buffer;

storing serial digital data output from the receiver temporarily at the receiving buffer;

outputting the serial digital data to a central processor in accordance with commands from the central processor;

analyzing the serial digital data using the central processor; and display the serial digital data on a display unit using a display controller.

18. The method for monitoring a tire condition of claim 17, further comprising inputting a signal and information to the central processor from an operating unit; initializing a communication protocol with the tire condition acquisition device using the central processor; and communicating with the tire condition acquisition device using the initialized communication protocol using the central processor.

19. The method for monitoring a tire condition of claim 17, wherein the operating unit includes a keyboard constructed of a plurality of switches, and wherein inputting a signal and information to the central processor from an operating unit comprises sending a command from at least one of the plurality of switches to the central processor to start initialization.

* * * * *